(12) United States Patent
Muthupandi

(10) Patent No.: US 12,430,278 B2
(45) Date of Patent: Sep. 30, 2025

(54) MEMORY INTERCONNECT SWITCH

(71) Applicant: Micron Technology, Inc., Boise, ID (US)

(72) Inventor: Satheesh Babu Muthupandi, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 23 days.

(21) Appl. No.: 18/433,191

(22) Filed: Feb. 5, 2024

(65) Prior Publication Data
US 2024/0296136 A1    Sep. 5, 2024

Related U.S. Application Data

(60) Provisional application No. 63/485,838, filed on Feb. 17, 2023.

(51) Int. Cl.
*G06F 13/42* (2006.01)
(52) U.S. Cl.
CPC .. *G06F 13/4221* (2013.01); *G06F 2213/0026* (2013.01)
(58) Field of Classification Search
CPC ............. G06F 13/4221; G06F 2213/0026
See application file for complete search history.

(56) References Cited

U.S. PATENT DOCUMENTS

| | | | | |
|---|---|---|---|---|
| 2020/0371692 A1* | 11/2020 | Van Doorn | ........... | G06F 3/0631 |
| 2021/0373851 A1* | 12/2021 | Stasior | ................ | G06F 3/0673 |
| 2023/0205432 A1* | 6/2023 | Nguyen | ................ | G06F 3/0683 711/154 |
| 2023/0228145 A1* | 7/2023 | Van Balen | ................ | E06B 9/01 49/57 |
| 2024/0281275 A1* | 8/2024 | Muthupandi | ....... | G06F 9/45558 |

* cited by examiner

*Primary Examiner* — Henry Tsai
*Assistant Examiner* — Christopher A Daley
(74) *Attorney, Agent, or Firm* — Wood IP. LLC; Theodore A. Wood

(57) ABSTRACT

A system and method of using the system may comprise: a rack; a first rack server mounted within the rack; and a device including Compute Express Link (CXL) switch fabric, processing circuitry operatively coupled to the CXL switch fabric, memory operatively coupled to the CXL switch fabric, and a chassis mounted within the rack, the chassis housing the CXL switch fabric, the processing circuitry, and the memory. The processing circuitry may be configured to control the CXL switch fabric to allocate or deallocate at least a portion of the memory to or from the rack server. The chassis may be arranged at a top of the rack. The processing circuitry may further be configured to control the CXL switch fabric to allocate or deallocate at least another portion of the memory to or from another rack server.

20 Claims, 8 Drawing Sheets

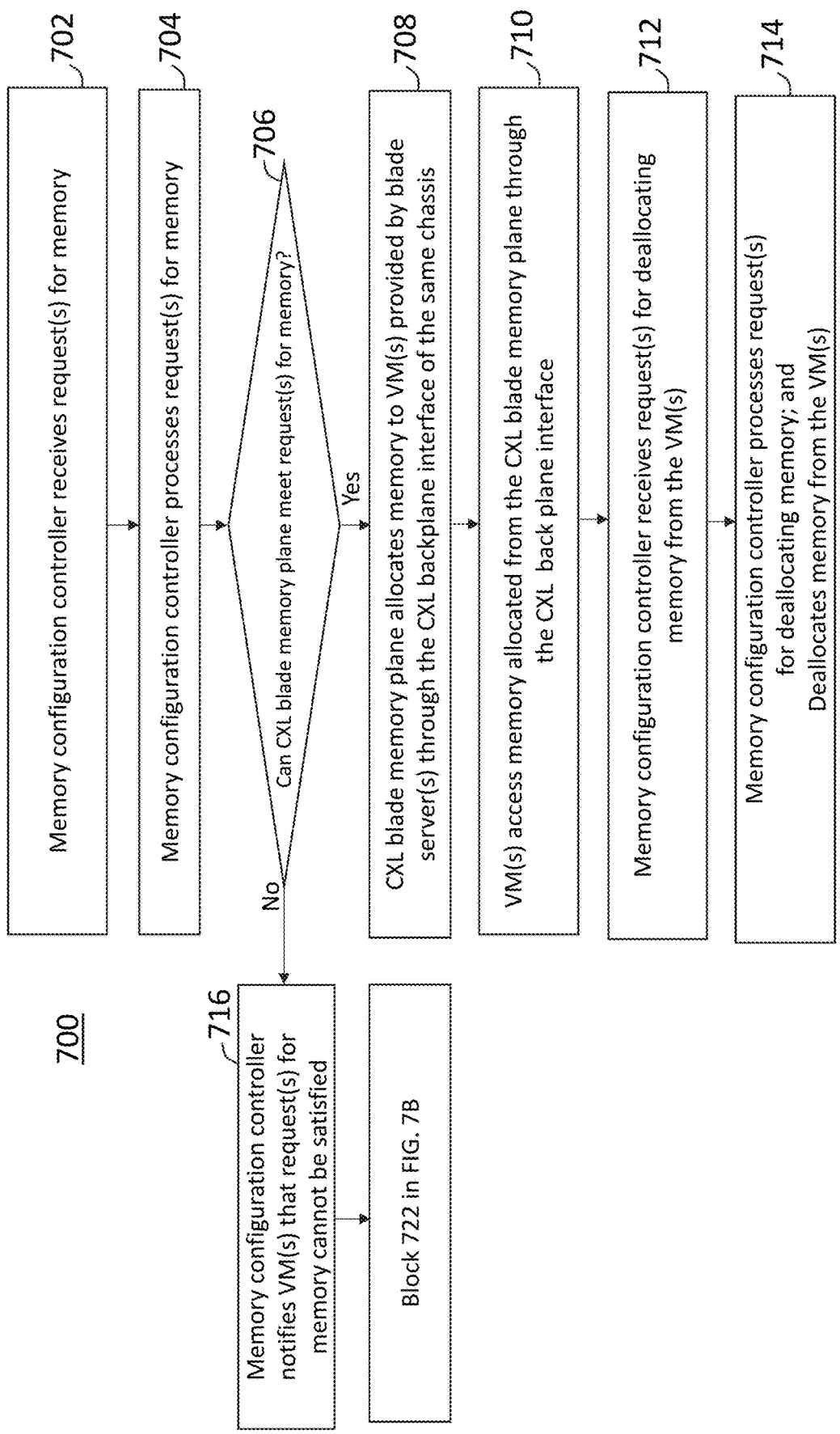

MEMORY INTERCONNECT SWITCH

CROSS-REFERENCE TO RELATED APPLICATION

This application claims benefit to U.S. Provisional Patent Application No. 63/485,838 filed Feb. 17, 2023, the disclosure is incorporated by reference herein in its entirety.

FIELD OF TECHNOLOGY

The present disclosure relates generally to a memory system, and more particularly to a memory system which provides switching to dynamically allocate additional memory to be accessible to server(s) in a data center.

BACKGROUND

Memory devices (also referred to as memory media devices) are widely used to store information in various electronic devices such as data servers. Various types of memory devices exist, including magnetic hard disks, random access memory (RAM), read-only memory (ROM), dynamic RAM (DRAM), synchronous dynamic RAM (SDRAM), static RAM (SRAM), flash memory, and others. Memory devices may be volatile or non-volatile. Volatile memory cells (e.g., DRAM cells) may lose their programmed states over time unless they are periodically refreshed by an external power source. SRAM memory may maintain their programmed states for the duration of the system being powered on. Non-volatile memory cells may maintain their programmed states for extended periods of time even in the absence of an external power source.

Many data servers for storing information can be housed together in racks with other infrastructure for providing network connectivity, data routing, security, execution of applications and computing, data analytics, and monitoring etc. to form a data center. The data center provides storage of a large amount of amount of data and applications, and also enables shared access to this large amount of data and applications.

The data center may include data servers having high-speed and high-density DRAMs formed on printed circuit boards. However, the amount of memory provided by each of the data servers may be exceeded by the memory capacity that is needed. (e.g., the amount of memory required to execute an application properly and efficiently may not be enough). A data server may be limited in its accessible memory because it includes only a limited number of slots for the DRAM and there may be a limited amount of space on the motherboard of the data server and a limited amount of physical space for the data server as a whole.

The amount of memory required for a data center may vary from time to time. For example, a video streaming company may require a 2 terabyte (TB) workload across its data servers on a typical weekend, but the required workload for the same video streaming company across its data servers may be significantly reduced (e.g., by 40% usage) for a typical weekday. The video streaming company may still be paying for the weekend capacity for memory storage even during the weekdays when the required workload is reduced and thus the paid-for memory capacity provided by the data center is being underutilized. Even though the data server has enough computing power, the video streaming company cannot reduce the number of data servers because of memory slot limitations, motherboard real estate and other bottlenecks.

It would therefore be beneficial to be able to dynamically expand the amount of memory (e.g., the amount of memory provided by the DRAM) accessible by a data server on demand to thereby enhance the performance of the data server. It would be further beneficial to dynamically relinquish that expanded amount of memory accessible by the data server when the required workload for the expanded amount of memory has ended such that amount of memory can be scaled to an appropriate level on demand.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

FIGS. 7A-7B illustrate blocks of an example process performed by the computing system according to some example embodiments of the present disclosure.

DETAILED DESCRIPTION

The present disclosure describes systems, apparatuses, and methods related to a system of memory banks that may be dynamically allocated to one or more host server(s) in a data center so that the host server(s) can expand its accessible memory capacity on demand. The memory that can be dynamically allocated to the host server(s) may be provided by (i) a CXL type 3 memory device, provided on a printed circuit board arranged within the same chassis of the host server(s) in need of or requesting additional memory, such that the allocated memory can accessed via communications conducted through a CXL back plane interface (rather than wired or optical cabling), and/or (ii) a CXL type 3 memory device, including CXL switch fabric housed within a chassis (e.g., a top of the rack chassis) arranged outside of the chassis housing the host server(s) in need of or requesting additional memory, such that the allocated memory can accessed via communications using optical or PCIe wire cabling.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

Figure 1:
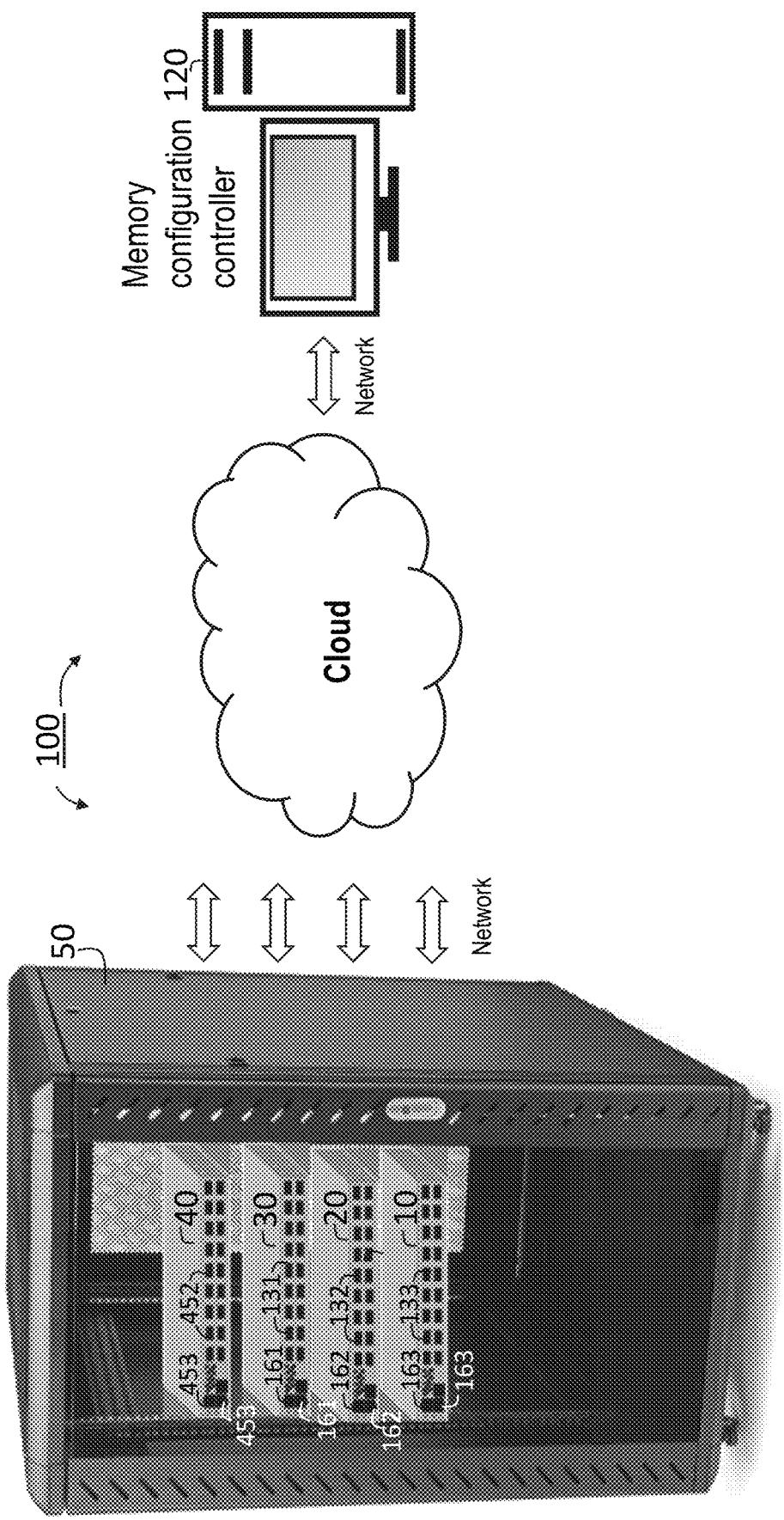
FIG. 1 illustrates an example computing system according to some example embodiments of the present disclosure.

FIG. 1 illustrates an example computing system 100 according to some example embodiments of the present disclosure. FIGS. 2-6 illustrate in more detail components of the example computing system 100 of FIG. 1, including operative logical connections and flow paths of information (e.g., data, commands, control signals and/or instructions) between components of the computing system 100, according to some example embodiments of the present disclosure.

The computing system 100 includes a rack 50, rack servers 10-30, a computing device 40, and a memory configuration controller 120. A chassis of each of the rack servers 10-30 and the computing device 40 is mounted within the rack 50 as shown in FIG. 1.

The memory configuration controller 120 may at least include memory, an operating system, and a CPU and/or other processing circuitry (e.g., a digital signal processor (DSP) and/or an application specific integrated circuit (ASIC)) including firmware.

The memory configuration controller 120 is capable of communicating information, such as data, commands, control signals and/or instructions, with each of the rack servers 10-30 (including each of the blade servers of each of the rack servers 10-30) and the computing device 40 over the cloud which includes servers accessible over the Internet and software and databases that are executed on those cloud servers.

The information provided by the memory configuration controller 120 and communicated over the cloud to the rack servers 10-30 (in particular, each of the blade servers of each of the rack servers 10-30) and the computing device 40 may be automatically generated or generated in response to user (e.g., a third-party administrator or another computer system) input at the memory configuration controller 120. While only one memory configuration controller 120 is shown in FIG. 1, it will be understood that additional memory configuration controller(s) 120 may communicate over the cloud with the rack servers 10-30 (and its components) and the computing device 40, thereby making it possible for different entities (e.g., different third-party administrators or vendors) to concurrently communicate over the cloud with the rack servers 10-30 (and its components) and the computing device 40.

While FIG. 1 shows the memory configuration controller 120 as remotely communicating over the cloud with the rack servers 10-30 (including blade memory planes and blade servers thereof) and the computing device 40 mounted within the rack 50, it will be understood that the memory configuration controller 120 may be implemented instead within one of the rack servers 10-30 such as within a blade server or a blade memory plane of any rack servers 10-30. For example, the instructions performed by the memory configuration controller 120 may be implemented as firmware within any one of the rack servers 10-30 or as software executed by a processing core within any one of the rack servers 10-30.

The network communications between the memory configuration controller 120 and the rack servers 10-30 and the computing device 40 over the cloud may enable a virtual machine being provided by operation of one of the rack servers 10-30 to obtain access to additional of memory provided by CXL blade memory plane (a component of that rack server 10-30) and/or the computing device 40. For example, the memory configuration controller 120 may receive a request from a user (e.g., a human administrator or a third party computer system) of the memory configuration controller 120 or a request from a virtual machine being provided by operation of one or more of the rack servers 10-30 for additional memory capacity.

In response to this request, the memory configuration controller 120 may determine whether the amount of additional memory requested can be provided by either CXL blade memory plane (a component of that same rack server 10-30 having the blade server(s) needing or requesting additional memory capacity) and/or the computing device 40 (arranged outside of that rack server 10-30 having the blade server(s) needing or requesting additional memory capacity).

If so, the memory configuration controller 120 may send instructions to the CXL blade memory plane (a component of that rack server 10-30) and/or the computing device 40 (arranged outside of that rack server 10-30) to allot the additional memory to the virtual machine provided by operation of the blade server needing or requesting additional memory capacity so that the virtual machine (e.g., upon reboot of the virtual machine) can have access to the additionally allotted memory.

Figure 6:
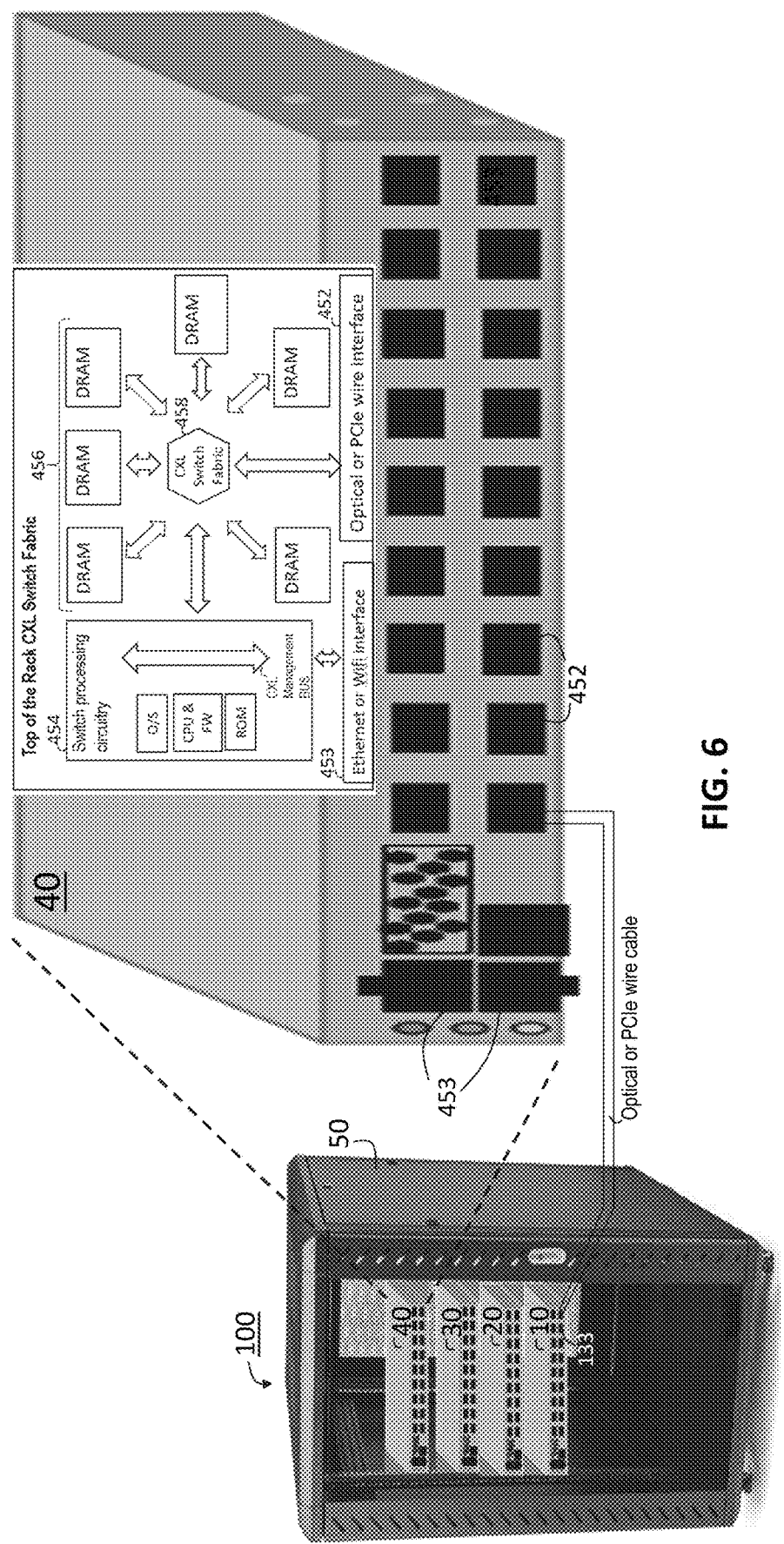
FIG. 6 illustrates the computing system of FIG. 1 including a top of the rack computing device and an example functional block diagram logically showing components of the top of the rack computing device according to some example embodiments of the present disclosure.

The computing device 40 may be a memory and switching device located at the top of the rack 50. The computing device 40 may be a memory and switching device insofar as memory may be selectively connected or disconnected, such as selectively connecting or disconnecting memory in response to a request. As shown in FIG. 6, the computing device 40 may include optical or PCIe wire interfaces 452, ethernet or Wifi interfaces 453, switch processing circuitry 454, memory 456 comprising DRAM, and switch fabric 458.

Conductivity between each of the rack servers 10-30 and the computing device 40 may be established through a CXL high-speed interconnect cable (wire) or an optical cable (e.g., QSFP-56, QSFP-DD or OSFP standards such as QSFP-56+™, QSFP-DD+™ or OSFP+™ to accommodate PCIe 5.0 CXL transfers) and associated CXL interfaces provided on each of the rack servers 10-30 and the computing device 40 without affecting the bandwidth and latency.

While the rack 50 illustrated in FIG. 1 includes only three rack servers 10-30, additional rack server(s) can be mounted within the empty rack slots. Alternatively, the number of rack server(s) mounted within the rack 50 can be less than that shown in FIG. 1. While the computing device 40 is shown as being located on the top of the rack 50 such that easy access to the cabling that connects the computing device 40 with the rack servers 10-30 within the rack 50 and other devices outside of the rack 50 may be enabled, it can be located at another location such as in an intermediate portion of the rack 50 such that one or more rack servers 10-30 is positioned above and below the computing device 40, or the computing device 40 can be located on the bottom of the rack 50.

Figure 2:
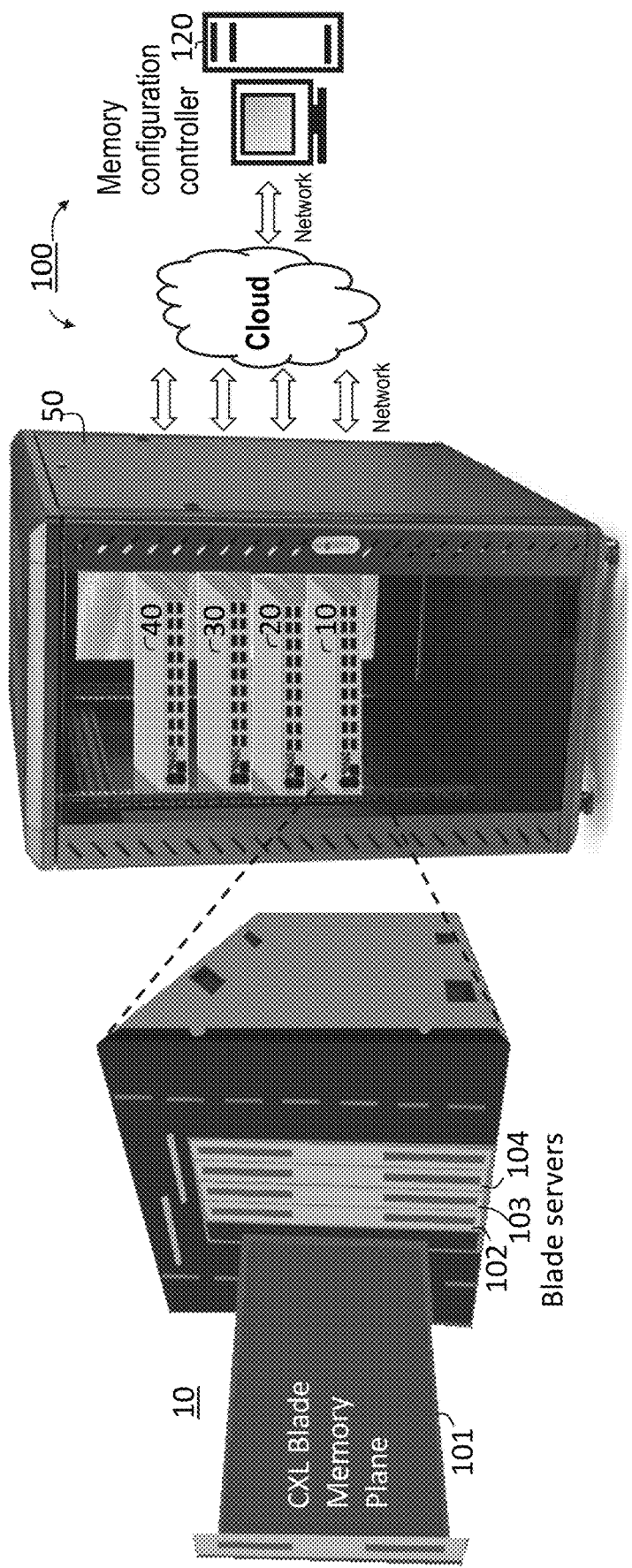
FIG. 2 illustrates the computing system of FIG. 1 including a rack server having a CXL memory plane and blade servers as components according to some example embodiments of the present disclosure.

FIG. 2 shows components of one rack server 10, although other rack servers 20, 30 may include the same types of components. The rack server 10 may include a CXL blade memory plane 101 and blade servers 102-104. Each of the CXL blade memory plane 101 and blade servers 102-104 may be housed within a box-like and modular-sized structure that may slide into and out of the rack server 10. A fewer or greater number of blade servers 102-104 can be incorporated into the rack server 10 based upon the space available in the rack server 10 (e.g., additional blade servers that can be inserted into the empty blade slots #4 and #5 in FIG. 5). A chassis of the rack server 10 is mounted within the rack 50 as shown in FIGS. 1-2.

As illustrated in FIGS. 1-5, a chassis of the rack server 10 may house a CXL back plane interface 110 and CXL back plane (PHY) connectors 111-114. The rack server 10 may also include optical or PCIe wire connectors 133 and communications interfaces 163, each of which includes physical ports arranged and exposed at the chassis of the rack server 10.

Each of the CXL back plane connectors 111-114 are connected to the CXL back plane interface 110. Each of the optical or PCIe wire connectors 133 may be connected to a corresponding one of interfaces 452 of the computing device 40 and thus each of the optical or PCIe wire connectors 133 serves as an interface for conducting communications with the computing device 40 through optical or PCIe wire cabling (e.g., each of the optical or PCIe wire connectors 133 serves as an interface for conducting communications with the computing device 40 through optical or PCIe wire cabling such that virtual machine(s) being provided by operation of the blade server(s) 102-104 of the rack server 10 can access at least a portion memory 456 of the computing device 40).

Similarly, the optical or PCIe wire connectors 131 and 132 of rack servers 30 and 20, respectively, may also be connected to a corresponding one of the interfaces 452 of the computing device 40 and thus each of the optical or wire connectors 131 and 132 serves as an interface for conducting communications with the computing device 40 through optical or PCIe wire cabling (e.g., each of the optical or wire connectors 131 and 132 serves as an interface for conducting communications with the computing device 40 through optical or PCIe wire cabling such that virtual machine(s) being provided by operation of the blade server(s) 102-104 of rack server(s) 30 and 20 can access portions of memory 456 of the computing device 40).

The communications interfaces 163 of the rack server 10 may be an ethernet or Wi-Fi interface for conducting communications with the memory configuration controller 120 over the cloud. Similarly, communications interfaces 161 and 162 in the rack servers 30 and 20, respectively, may also be an ethernet or Wi-Fi interface for conducting communications with the memory configuration controller 120 over the cloud. The communications of each of the rack servers through the communications interfaces 161-163 may include data, commands, control signals and/or instructions which enable virtual machine(s) provided by blade server(s) 102-104 to access allotted memory 156 of the CXL blade memory plane 101 and/or allotted memory 556 of the computing device 40. For example, the blade server 104 can transmit a request for additional memory through the one of the communications interfaces 163 over the cloud to the memory configuration controller 120.

As another example, the blade server 104 can transmit data, indicating how much of its own memory 147 is accessible, through one of the communications interfaces 163 over the cloud to the memory configuration controller 120 so that the memory configuration controller 120 can determine how much additional memory needs to be allotted to the blade server 104 (beyond its own accessible dedicated memory 147) from the memory 156 of the CXL blade memory plane 101 and/or the memory 456 of the computing device 40 and also determine if enough memory 156 of the CXL blade memory plane 101 of the same rack server and/or memory 456 of the computing device 40 is available for the blade server 104. The IP addresses of the blade servers 102-104 and the memory configuration controller 120 are known to each other to enable Internet communication over the cloud.

CXL blade memory plane 101 of the rack server 10 may communicate with the memory configuration controller 120 over the cloud. Similarly, CXL blade memory planes of the rack servers 20-30 may also communicate with the memory configuration controller 120 over the cloud. For example, the communications such as data, commands, control signals and/or instructions of the CXL blade memory plane 101 of the rack server 10 may be through one of the communications interfaces 163 or the CXL back plane interface 110 via mutually known IP addresses. These communications enable virtual machine(s) provided by blade server(s) 102-104 to be allotted and have access to memory 156 of the CXL blade memory plane 101.

For example, the memory configuration controller 120 may transmit instructions or requests through one of the communications interfaces 163 or the CXL backplane interface 110 that a portion of the memory capacity of memory 156 of the CXL blade memory plane 101 is to be allotted to a virtual machine(s) being provided by one or more of the blade server(s) 102-104. These instructions received from the memory configuration controller 120 can be processed by the CXL device core 154 to control the CXL switching circuitry 158 so that that a portion of the memory 156 can be appropriately allotted and switched to the virtual machine provided by the blade server 104. Upon reboot of the blade server 104, the virtual machine provided by that blade server 104 may access the allotted portion of the memory 156 in addition to its own dedicated memory 147.

As another example, the CXL blade memory plane 101 can transmit data, indicating how much of its own memory 156 is free to be allotted to the virtual machine provided by the blade server 104, to the memory configuration controller 120 so that the memory configuration controller 120 can determine whether or not enough of the memory 156 is free to satisfy the need or request for additional memory of the virtual machine provided by the blade server 104. If not, the memory configuration controller 120 may conduct further communications with the computing device 40 to determine whether or not enough of memory 456 is free to satisfy the need for additional memory of the virtual machine provided by the blade server 104.

The CXL back plane connector 111 is connected to both the CXL memory plane 101 and the CXL back plane interface 110. The CXL back plane connectors 112-114 are each connected to the CXL back plane interface 110 and respectively connected to the blade servers 102-104. The CXL back plane interface 110 and the CXL back plane connectors 111-114 may handle the Compute Express Link™ (CXL) protocol and provide communications (e.g., data, commands, control signals and/or instructions) at least between CXL blade memory plane 101 and the blade servers 102-104 such that the device formed by printed circuit board and its mounted or connected components may be regarded as a "CXL blade memory plane" 101 (or "CXL memory device controller") including a "CXL device core" 154, and the back plane interface 110 may be regarded as the "CXL back plane interface" 110.

The CXL blade memory plane 101 (including components such as the CXL device core 154, the memory 156, and the CXL switching circuitry 158), CXL back plane connectors 111-114 and the CXL back plane interface 110 can thus be a CXL compliant memory system. CXL is a high-speed central processing unit (CPU)-to-device and CPU-to-memory interconnect designed to accelerate next-generation data center performance. CXL technology maintains memory coherency between the CPU memory space and memory on attached devices. This allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as I/O protocol, memory protocol (e.g., initially allowing a host to share memory with an accelerator), and coherency interface.

Since the CXL blade memory plane 101 (including the CXL device core 154 and CXL management BUS), CXL back plane connectors 111-114 and the CXL back plane interface 110 are CXL compliant, the processing circuitry including the CXL device core 154 and CXL management BUS of the CXL blade memory plane 101 may use CXL protocols to provide management and communications through the CXL back plane interface 110 and CXL back plane connectors 111-114.

The CXL blade memory plane 101 may be operatively connected to one or more of the blade servers 102-104, which can serve as one or more host servers, through the CXL back plane connector 111, the CXL back plane interface 110 and one or more of the respective CXL back plane connectors 112-114. The CXL blade memory plane 101 may can thus "locally" communicate with the blade servers 102-104 with structure such as the CXL back plane interface 110 provided within the chassis forming the rack server 10. These communications may, for example, allow virtual machines provided by the blade servers 102-104 to access memory provided on the CXL blade memory plane 101 through the CXL back plane interface 110 on demand.

The CXL blade memory plane 101 includes a printed circuit board with electrical components mounted thereon. These mounted electrical components include IC chips respectively implementing the CXL device core 154, the memory 156, and the CXL switching circuitry 158, in addition to the CXL back plane connector 111 which is connected to the printed circuit board.

The CXL device core 154 of the CXL blade memory plane 101 may at least include memory, an operating system, a CPU, CXL management BUS and/or other processing circuitry (e.g., a DSP and/or an ASIC) including firmware, each of which may communicate with one other via the CXL management BUS or other communications mechanisms including wireless communications mechanisms. The CXL device core 154 can control a transfer of information such as data, commands, control signals and/or instructions with the CXL switching circuitry 158 to provide the required switching to enable a requested amount of the memory 156 such as a portion or all of it to be allocated to the blade servers 102-104 (e.g., virtual machines provided by the blade servers 102-104) through the CXL back plane connector 111 and the CXL back plane interface 110.

The memory 156 of the CXL blade memory plane 101 may form a CXL type 3 memory device. The memory may be formed by DRAM, but other types of memory may instead be used, such as other types of volatile memory including magnetic hard disks, random access memory (RAM), read-only memory (ROM)), synchronous dynamic RAM (SDRAM), static RAM (SRAM), flash memory, or non-volatile memory including flash memory, electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), or 3D XPoint™ memory.

Figure 3:
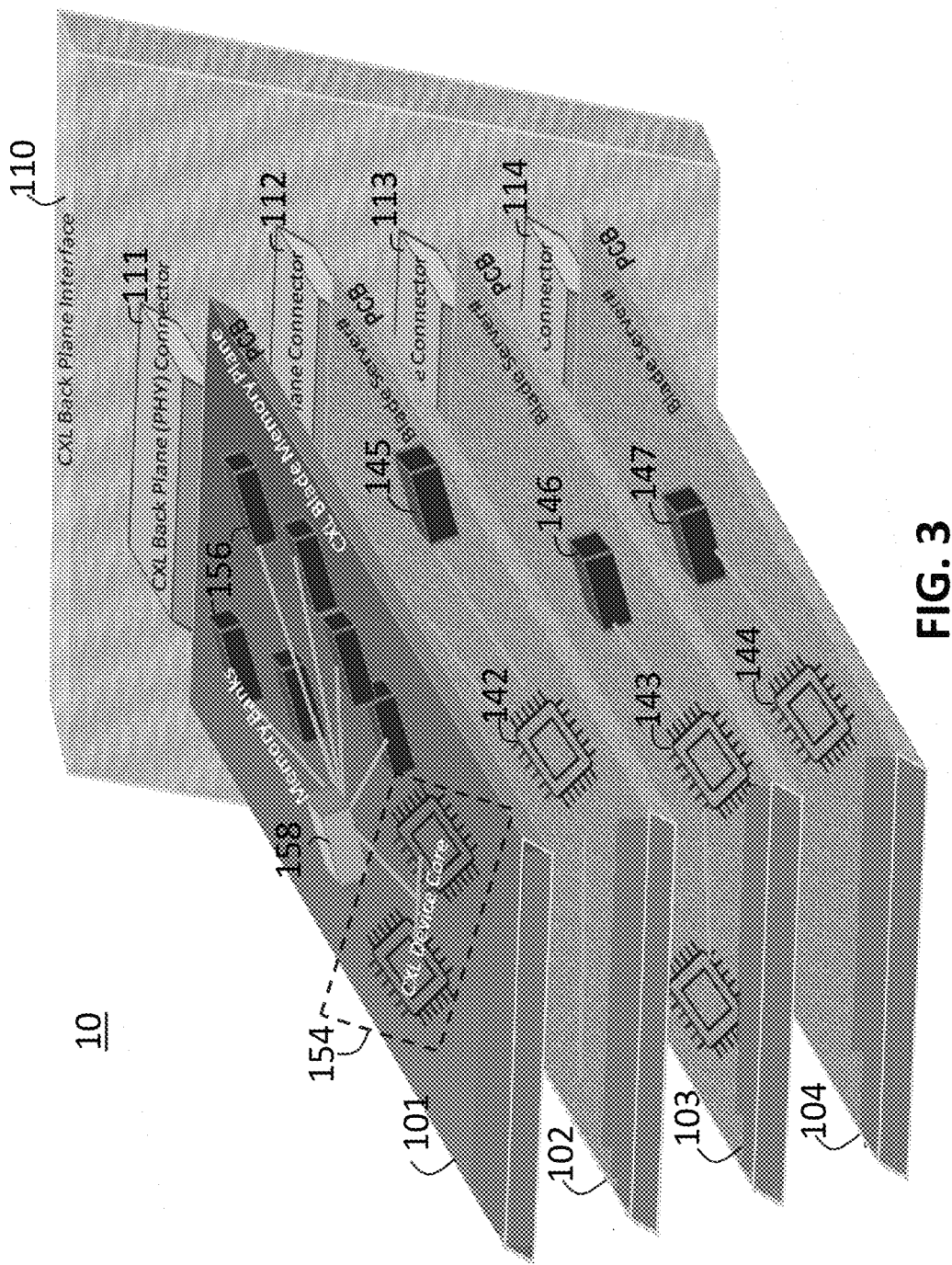
FIG. 3 illustrates an example functional block diagram logically showing components of the computing system according to some example embodiments of the present disclosure.
Figure 4:
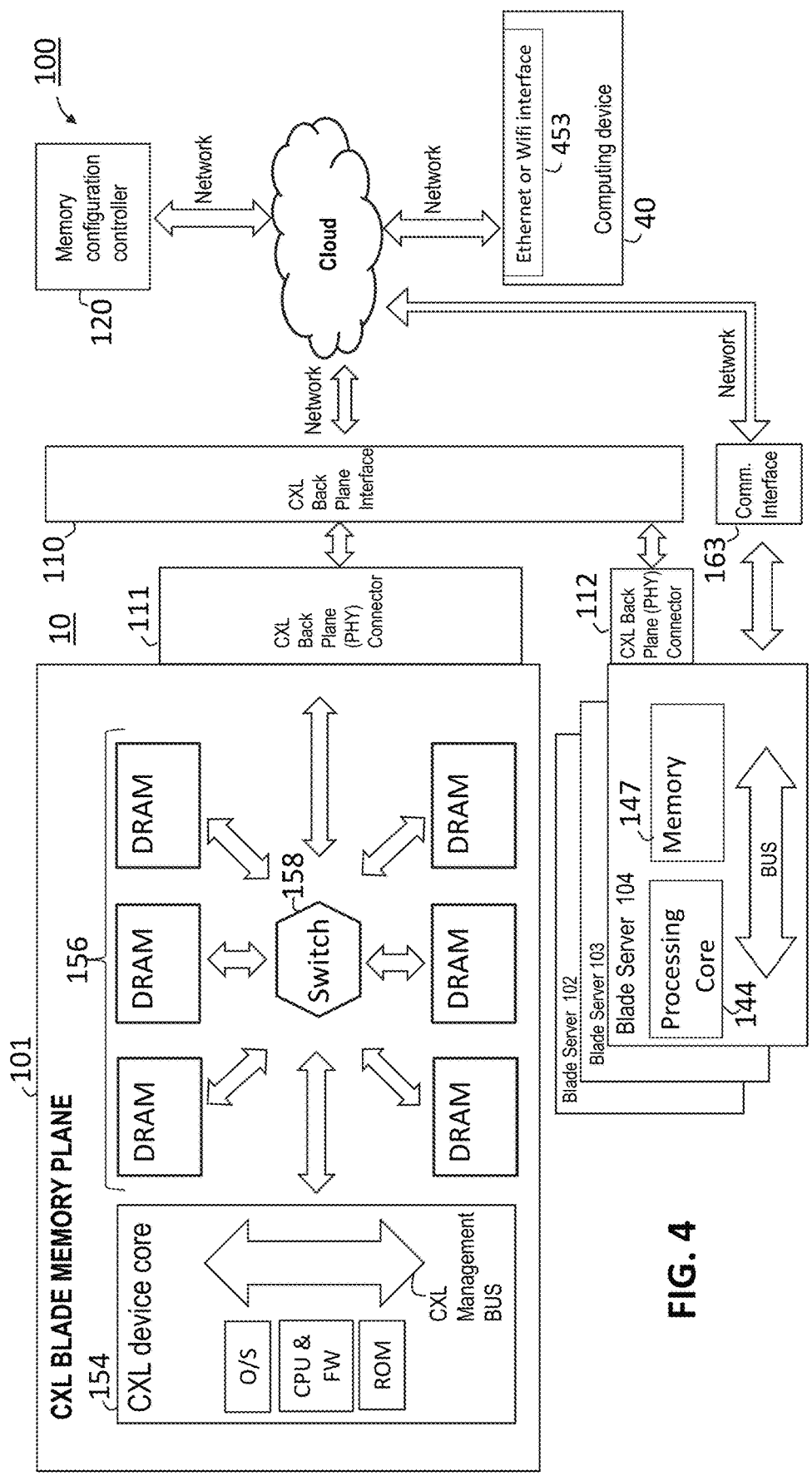
FIG. 4 illustrates an example functional block diagram logically showing components of the computing system, including flow paths of information (e.g., data, commands, control signals and/or instructions) between components of the computing system, according to some example embodiments of the present disclosure.
Figure 5:
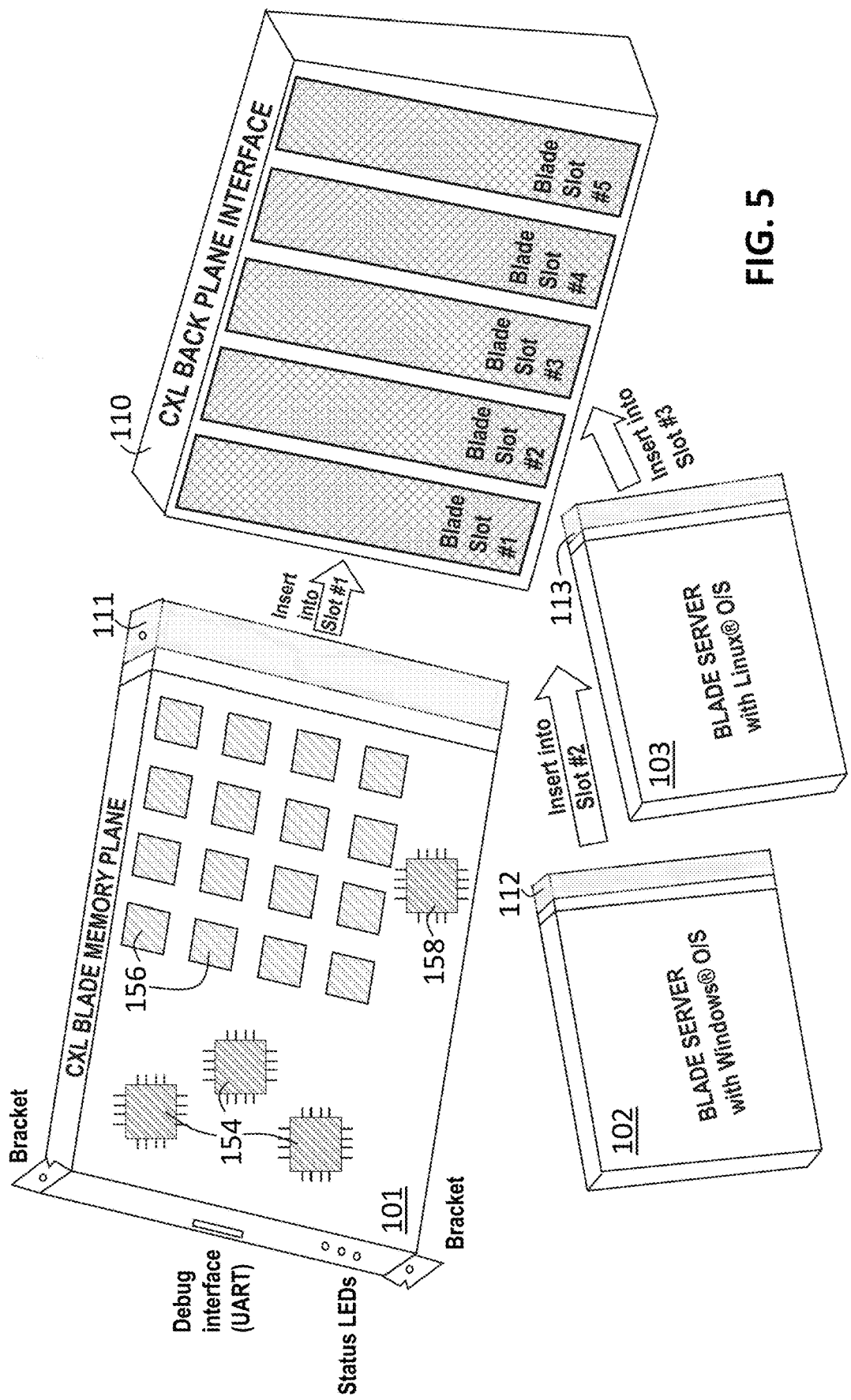
FIG. 5 illustrates the example components of the computing system including a CXL memory plane and the CXL back plane interface according to some example embodiments of the present disclosure.

While the example embodiment illustrated in FIGS. 3-4 shows 6 IC chips forming the memory 156, the number of IC chips and hence the amount of memory capacity forming the memory 156 can be scaled to a different number of chips (e.g., see FIG. 5 showing additional IC chips) and hence a different amount of memory capacity subject to spatial limitations of the printed circuit board of the CXL blade memory plane 101. The amount of memory capacity that may be provided by memory 156 of the CXL blade memory plane 101 may be greater than the amount of memory capacity that may be provided by each of the memories 145, 146, 147 of respective blade servers 102, 103 and 104.

For example, the amount of memory capacity that may be provided by memory 156 of the CXL blade memory plane 101 may be 100 gigabyte (GB)-4 TB, whereas the memory capacity that may be provided by each of the memories 145, 146, 147 of respective blade servers 102, 103 and 104 may be 4 GB-64 GB. The amount of memory that is accessible by a virtual machine provided by a particular blade server is not limited to the memory capacity of memory 145, 146 or 147, but instead can be greatly expanded by the much larger memory capacity available through memory 156 of the CXL blade memory plane 101.

The memory 156 can therefore serve to dynamically expand the memory that is already accessible by each of the blade servers 102-104, such as a memory 145-147 that is mounted on the respective printed circuit boards of each of the blade servers 102-104, through local communications provided through the CXL back plane connector 111, the CXL back plane interface 110, and the respective CXL back plane connectors 112-114 of the blade servers 102-104. Because of this direct conductivity between the memory 156 and the blade servers 102-104 provided by the CXL back plane connector 111, CXL back plane interface 110, and the respective CXL back plane connectors 112-114 housed within the same chassis forming the rack server 10, the communications between the memory 156 and the blade servers 102-104 can be performed with high speed and low latency.

That is, a virtual machine provided by execution of a blade server 102-104 can access on demand an allocated portion of memory 156 through this direct connection provided by the CXL back plane connector 111, CXL back plane interface 110, and the respective CXL back plane connectors 112-114 within the same rack server 10 with high speed and low latency and without losing bandwidth.

The CXL switching circuitry 158 of the CXL blade memory plane 101 is operatively coupled to the CXL device core 154 and the memory 156. The CXL switching circuitry 158 may operate under the control of the CXL device core 154 and instructions received from the memory configuration controller 120 to selectively connect portions of the memory 156 on the CXL blade memory plane 101 with one or more of the blade servers 102-104 to thereby dynamically expand the memory capacity of the memory 145-147 that is respectively accessible to the one or more of the blade servers 102-104 (e.g., accessible to virtual machines provided by the one or more blade servers 102-104) on demand.

After the need for expanded memory is over, the CXL switching circuitry 158 may operate under the control of the CXL device core 154 and instructions received from the memory configuration controller 120 to selectively disconnect portions of the previously allotted memory 156 from one or more of the blade servers 102-104 to thereby dynamically deallocate a portion of or all of the previously allocated memory capacity of memory 156 from the one or more of the blade servers 102-104 on demand. Even when all of the previously allocated memory 156 has been deallocated, the blade servers 102-104 can still access its own dedicated memory 145-147 provided on the same printed circuit boards of each of the blade servers 102-104 and any memory 456 allocated to each of the blade servers 102-104 from the computing device 40 via optical or PCIe wire interfaces 131-133.

Each of the blade servers 102-104 includes a printed circuit board with electrical components mounted thereon. These mounted electrical components include IC chips implementing the processing core 142, 143 and 144 of blade servers 102, 103 and 104, respectively, and the memory 145, 146 and 147 of blade servers 102, 103 and 104 respectively. Each processing core 142, 143 and 144 is operatively coupled to the memory 145, 146 and 147 mounted on the printed circuit board of blade servers 102, 103 and 104, respectively. Each of the blade servers 102, 103, and 104 also includes the CXL back plane connectors 112, 113, and 114, respectively. Each of the CXL back plane connectors 112, 113, and 114 are respectively connected to the printed circuit boards of the blade servers 102, 103 and 104, respectively, and the CXL back plane interface 110.

Each processing core 142, 143 and 144 of the blade server 102, 103 and 104 may at least include memory, an operating system, and a CPU and/or other processing circuitry (e.g., a DSP and/or an ASIC) including firmware, each of which may communicate with one other via a bus or other communications mechanisms including wireless communications mechanisms. Each processing core 142, 143 and 144 is operatively coupled to the memory 145, 146 and 147, and the CXL back plane connector 112, 113 and 114, respectively.

Each processing core 142, 143 and 144 can control a transfer of information such as data, commands, control signals and/or instructions with the CXL memory plane 101, particularly the CXL device core 154 of the CXL memory plane 101, such that the CXL device core 154 operates to control the CXL switching circuitry 158 to perform the required switching to enable a requested or needed amount of at least a portion of the memory 156 to be allocated to the blade servers 102-104 through the CXL back plane interface 111, CXL back plane interface 110 and the CXL back plane connectors 112-114.

For example, each processing core 142, 143 and 144 can transmit a request for additional memory to the memory configuration controller 120 through communication interfaces 163 and the cloud so that its respective blade server 102, 103 and 104 can be allocated at least a portion of the memory 156 of the CXL blade memory plane 101, and access the portion of the memory 156 allocated to that blade server 102, 103 and 104 through the CXL back plane connector 111, the CXL back plane interface 110, and the appropriate CXL back plane connector 112-114.

Each processing core 142, 143 and 144 can also control a transfer of information such as data, commands, control signals and/or instructions with the computing device 40 (in particular, the switch processing circuitry 454 and the switch fabric 458 in the chassis at the top of the rack) such that the computing device 40 operates to control the switch fabric 458 to perform the required switching to enable at least a portion of the memory 456 to be accessible to the blade servers 102, 103 and 104 through the optical or PCIe interface 131, 132 and 133.

For example, each processing core 142, 143 and 144 can transmit a request for additional memory to the memory configuration controller 120 through communication interfaces 163 and the cloud so that its respective blade server 102, 103 and 104 can be allocated at least a portion of the memory 456 of the computing device 40, and access the portion of the memory 456 allocated to that blade server 102, 103 and 104 through one of the optical or PCIe wire interfaces 452, the CXL optical or wire cabling, and one of the corresponding optical or PCIe wire interfaces 133 of the rack server 10.

Each blade server 102-104, such as a virtual machine provided by operation of the blade server 102-104, can thus expand its memory capacity provided by its own dedicated memory 145, 146 and 147, respectively, by being dynamically allocated additional memory capacity provided by memory 156 through the CXL back plane interface 110 and appropriate CXL back plane connectors 111-114.

For example, blade server 102 can expand its memory capacity provided by memory 145 by being allocated additional memory capacity provided by a portion of memory 156 through the CXL back plane interface 110 and corresponding CXL back plane connectors 111-112. At the same time, the blade server 103 can also expand its memory capacity provided by memory 146 by allocating additional memory capacity from another portion of memory 156 through the CXL back plane interface 110.

The additional memory capacity obtained by the blade server(s) 102-104 from memory 156 can be accessed with high speed and efficiency since the memory 156 is local (i.e., within the same chassis forming the rack server 10). Additionally, the direct conductivity between the CXL blade memory plane 101 and each of the blade servers 102-104 is established through the CXL back plane interface 110 (rather than cabling). Each printed circuit board of the CXL blade memory plane 101 and blade server 112-114 is connected without cabling.

Each blade server 102, 103, and 104 can also expand its memory capacity provided by memory 145, 146 and 147, respectively, by being dynamically allocated additional memory capacity provided by memory 456 through one of the optical or PCIe wire interfaces 452 of the computing device 40, optical or wire cabling and a corresponding one of the optical or PCIe wire interfaces 131, 132, 133 of the rack server 30, 20 and 10, respectively.

For example, blade server 102 of rack server 20 can dynamically expand its memory capacity provided by the memory 456 of the computing device 40. This dynamic expansion occurs by allocating additional memory capacity from a portion of the memory 456 and accessed through one of the optical or wire interfaces 452, the optical or wire interface 132. At the same time, the blade server 103 can dynamically expand its memory capacity, provided by the memory 456 allocating additional memory capacity from another portion of memory 456 in the manner noted above.

The amount of memory available in each of the CXL blade memory plane 101 and the computing device 40 can be much larger than the memory directly available on each blade server 102-104. For example, a memory capacity of 100 GB to 4 TB or more may be available in each of the CXL blade memory plane 101 and the computing device 40. A memory capacity of 4 GB to 64 GB may be available on each blade server itself. Each blade server 102-104 can therefore dynamically expand its accessible memory beyond the memory 145-147 directly provided on the printed circuit board of each blade server 102-104. This dynamic expansion occurs by accessing on demand at least a portion of memory 156 on the CXL blade memory plane 101 and/or the memory 456 without losing bandwidth or latency.

Any portion of the memory 156 or 456 that has not been allocated to a blade server 102-104 of any of the rack servers 10-30 can the allocated to any blade server 102-104 of any of the rack servers 10-30. If a blade server 102-104 of any of the rack servers 10-30 needs additional memory, the memory configuration controller 120 may provide operation such that that blade server 102-104 first looks to obtain that memory 156 locally within that same rack server 10-30.

The memory 156 is accessible through the CXL back plane interface 110 connected to the blade server 102-104 that needs additional memory. If the memory 156 within the same rack server 10-30 cannot meet the demand (e.g., previously allocated to other blade server(s) to increase memory capacity), the memory configuration controller 120 can obtain the needed memory capacity from the memory 456. The memory 456 is accessible to the blade server 102-104 through one of the optical or wire interfaces 452, the optical or wire cabling and the connected one of the optical or wire interfaces 131-133.

The blade servers 102-103 can operate using the same or different operating systems. By way of example, the blade server 102 can operate using a Windows® operating system, whereas the blade server 103 of the same rack server can operate under a Linux® operating system, as show in FIG. 5. The rack server 10, including the blade servers 102-103 operating under different operating systems, can thus constitute a heterogeneous system, and thereby increase its flexibility and capabilities. Each of the blade servers 102 and 103 operating using different operating systems may alternatively be arranged in different rack servers (e.g., the blade server 102 operating using a Windows® operating system can be in the rack server 10, whereas the blade server 103 operating using a Linux® operating system can be in the [different] rack server 20).

The computing device 40 may constitute a memory and switching device (a CXL memory and switching device 40) insofar as it may be configured to selectively connect or disconnect the memory 456 to other devices such as any of the blade servers 102-104 of any of the rack servers 10-30 through operation of the switch fabric 458. This process may be controlled by the switch processing circuitry 454 and instructions provided by the memory configuration controller 120. The switch processing circuitry 454 may at least include memory, an operating system, and a CPU and/or other processing circuitry (e.g., a DSP and/or an ASIC) including firmware. The circuitry and processor may communicate with one other via a bus or other communications mechanisms including wireless communications mechanisms.

The switch processing circuitry 454 can control a transfer of information such as data, commands, control signals and/or instructions with the switch fabric 458 to provide needed switching. This switching enables a requested amount of the memory 456, such as a portion or all, to be allocated to the blade servers 102-104. The allocation occurs through optical or wire cabling that connects one of the optical or wire interfaces 452 and a corresponding one of the optical or wire interfaces 131-133.

For example, see FIG. depicting an optical or PCIe wire cable connecting one of the optical or wire interfaces 452 and a corresponding one of the optical or PCIe wire interfaces 133. It is to be understood that any of the ports forming the optical or wire interface 452 of the computing device 40 can be connected to any of the ports of the optical or PCIe wire interfaces 131-133 of any of the rack servers 10-30. For example, the switch processing circuitry 454 may respond to a request or instruction received through the ethernet or Wi-Fi interface 453 from the memory configuration controller 120 serving as an administrator to control the switch fabric 458. This enables portions of the memory 456 to be selectively connected/disconnected to any of the blade server(s) 102-104 in any of the rack server(s) 10-30 arranged outside of the computing device 40.

In accordance with the request or instructions received from the memory configuration controller 120, the switch processing circuitry 454 can thus control or manage the switch fabric 458 to selectively allocate portions of memory 456 to any rack server 10-30. In particular, portions of the memory 456 can be selectively allocated to a virtual machine provided by any blade server 102-104 of any of the rack servers 10-30.

A virtual machine provided by any one or more of blade servers 102-104 can thus respectively access the memory 145-147. Correspondingly, the virtual machine may also access, through the CXL optical or wire cabling and corresponding optical or PCIe interfaces 131-133 and 452 connected by the optical or wire cable, extra memory capacity. The extra memory capacity is provided by a portion of the memory 456 selectively connected to the blade server 102-104 by the switch fabric 458 under the control of the switch processing circuitry 454 and instructions received from the memory configuration controller 120. The blade servers 102-104 allotted additional memory from the memory 456 may be located within the same or different rack servers 10-30.

The memory 456 of the computing device 40 may form a CXL type 3 memory device. The memory 456 may be formed by DRAM, but other types of memory may instead be used, such as other types of volatile memory including magnetic hard disks, RAM, ROM, magnetoresistive random-access memory (MRAM), etc. While the example embodiment illustrated in FIG. 6 shows 6 IC chips forming the memory 456, the number of IC chips and hence the amount of memory capacity forming the memory 456 can be scaled to a different number of chips and hence a different amount of memory capacity subject to spatial or other limitations of the computing device 40.

The memory 456 can serve to dynamically expand the memory already accessible by each of the blade servers 102-104 of the rack servers 10-30, such as the memory 145-147. The memory 145-147 is mounted on the respective printed circuit boards of each of the blade servers 102-104, in the manner noted above. The control communications necessary to dynamically expand the memory may be accomplished by other communications and data transfer between the switch processing circuitry 454 and the memory configuration controller 120 through the cloud and the ethernet or Wi-Fi interface 453.

The switch fabric 458 is operatively coupled to the switch processing circuitry 454 and the memory 456. The switch fabric 458 may operate under the control of the switch processing circuitry 454 to selectively connect portions of the memory 456 with one or more of the blade servers 102-104 to dynamically expand the memory capacity of the memory accessible to the blade servers 102-104. The dynamic expansion is responsive to a request. The request may be received through the Internet or Wi-Fi interface 453 and/or instructions from the CXL blade memory plane 101 or blade server 102-104.

After the need for the expanded memory capacity ends, the switch fabric 458 may operate under the control of instructions received from the memory configuration controller 120 of the switch processing circuitry 454. This process may selectively disconnect portions of the previously allotted memory 456 from one or more of the blade servers 102-104 to dynamically deallocate a portion or all of the previously allocated memory capacity. Even when all of the previously allocated memory 456 has been deallocated, the blade servers 102-104 can access their own dedicated memory 145-147.

The interface 452, switch processing circuitry 454, and switch fabric 458 may handle the CXL protocol and provide communications (e.g., data, commands, control signals and/or instructions) between at least CXL blade memory plane and the blade servers 102-104. In this manner, the computing device 40 may be regarded as a CXL switch and memory device. The interface 452, the switch processing circuitry 454, and the switch fabric 458 may be respectively regarded as the CXL interface 452, ant the CXL switch processing circuitry 454, and the CXL switch fabric 458.

Figure 7B:
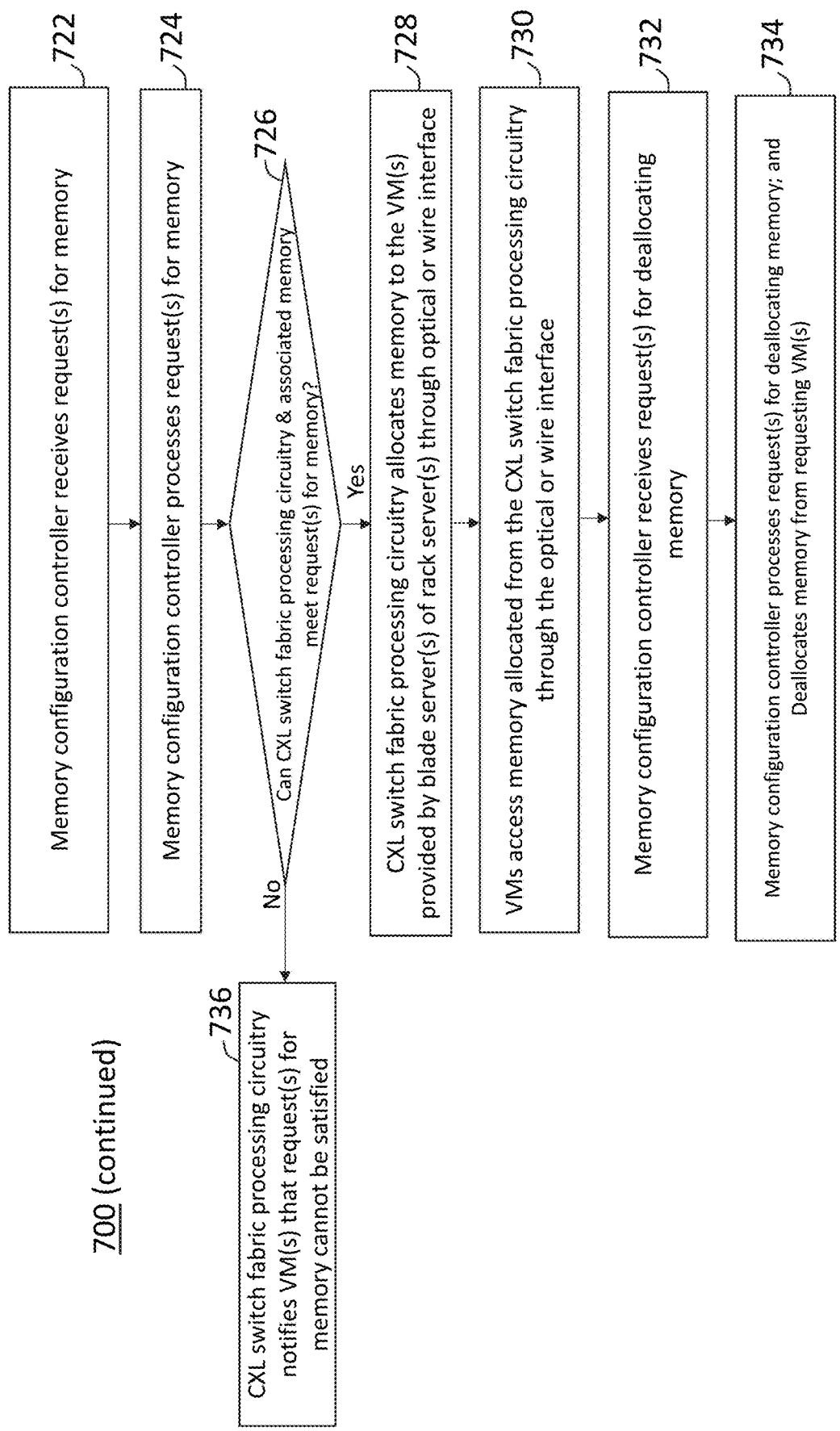

FIGS. 7A-7B illustrate blocks of an example process 700 performed by the computing system 100 according to the embodiments. While portions of the following disclosure describe some operations performed by the rack server 10 of the computing system 100, it will be understood that the same or similar operations could be performed by or within another rack server 20 or 30 of the computing system 100. Portions of the following disclosure describe operations performed by the blade server 102 and it will be understood that the same or similar operations could be performed by another blade server 103 or 104 within the same rack server 10 or by another blade server within another rack server 20 and/or 30.

While portions of the following disclosure describe operations performed by the CXL blade memory plane 101 in rack server 10, it will be understood that the same or similar operations could be performed by another CXL blade memory plane in another rack server 20 and/or 30. While portions of the following disclosure describe some operations performed by the memory configuration controller 120 which is positioned remotely from the rack 50 and which communicates with rack servers 10-30 and computing device 40 over the cloud, it will be understood that the memory configuration controller 120 could instead be implemented in one of the rack servers 10-30 such as in the CXL blade memory plane 101 of one of the rack servers.

In block 702 of process 700, the memory configuration controller 120 receives at least one request for additional memory. This request for additional memory essentially indicates that the memory capacity of a memory that may be accessed by a host server be expanded. This request for additional memory may be received through an input interface provided on the memory configuration controller 120 and/or received through communications from any one of the blade servers 102-104 of any one the rack servers 10-30.

Requests received through the input interface provided on the memory configuration controller 120 may be from a human user input or may be generated from another computer. Requests received through communications from any one of the blade servers 102-104 of any one of the rack servers 10-30 may be provided by network communications transmitted through the communications interfaces 163 or CXL backplane interface 110 over the cloud to the memory configuration controller 120.

Each request, received through the input interface provided on the memory configuration controller 120 and/or received through communications from any one of the blade servers 102-104 of any one the rack servers 10-30, may designate how much memory capacity is required. For example, a first request may indicate that 100 GB of memory is needed for a virtual machine being provided by one blade server 102, and a second request may indicate that 2 TB is needed for a virtual machine being provided by another blade server 103.

In block 704, the memory configuration controller 120 processes the request(s) for additional memory. In particular, the memory configuration controller 120 may operate to determine if the CXL memory plane 101 can satisfy the request(s) for memory. This may involve the memory configuration controller 120 conducting communications with the CXL blade memory plane 101 to determine the amount of memory 156 that is available to be allotted to the blade server 102-104 in need of memory and conducting communications with the blade server 102-104. The communication determines the amount of additional memory needed by the blade server 102-104 (e.g., the amount of additional memory that is needed by the blade server 102-104 to execute a particular application) in a case where the original request does not indicate how much additional memory is needed.

If the memory configuration controller 120 determines that the amount of available memory capacity of memory 156 is larger than or equal to the amount of memory needed by the blade server 102-104 (in particular, the virtual machine(s) being provided by the blade server(s) 102-104), the memory configuration controller 120 (or the CXL device core 154 in the case in which the operations performed by the memory configuration controller 120 are implemented within the rack server 10 itself) can determine that the request for memory can be met.

For example, if the memory configuration controller 120 determines the amount of available capacity of memory 156 is 4 TB, and the first and second requests for memory are for 100 GB and 2 TB, respectively, the memory configuration controller 120 can determine that the first and second requests can be satisfied.

If, however, the memory configuration controller 120 determines the amount of available capacity of memory 156 is less than that needed or requested (perhaps because portions or all of the memory 156 have already been allocated to expand the memory capacity of other host servers), the memory configuration controller 120 can determine that the first and second requests cannot be satisfied. Alternatively, the memory configuration controller may determine that only one of the requests (in this foregoing example, the first request for only 100 GB [the lesser amount]), can be satisfied.

If the memory configuration controller 120 determines the request(s) for additional memory can be successfully satisfied ("Yes" in block 706), the CXL blade memory plane 101 will, per the request(s), allocate memory to the virtual machine(s) provided by the blade server(s) 102-104 in block 708. In particular, the memory configuration controller 120 can communicate an instruction over the cloud and through either one of the communications interfaces 163 or the CXL backplane interface 110 to the CXL blade memory plane 101. The instruction may be to allocate at least a portion of memory 156 to the virtual machine(s) provided by the blade server(s) 102-104 in block 708.

The CXL device core 154 may process this instruction received from the memory configuration controller 120. In particular, the CXL device core 154 will provide data, commands and instructions to the CXL switching circuitry 158 to control the switching. This control selectively connects portion(s) of the memory 156 to the blade server(s) 102-104 through the CXL back plane connector 111 to satisfy the blade server's need or request for additional memory.

The CXL device core 154 thus allocates a portion or all of the capacity of memory 156 to the blade servers 102-104 to satisfy the need(s) or request(s) for additional memory using the CXL back plane interface 110. Each of the CXL blade memory plane 101 and the blade servers 102-104 are connected via the CXL back plane connector 111 and CXL back plane connectors 112-114, respectively.

In the foregoing example, the CXL device core 154 may allocate 100 GB of its 4 TB memory capacity of memory 156 to blade server 102 to satisfy the first request for memory in accordance with an instruction received from the memory configuration controller 120. The CXL device core 154 may also allocate 1 TB of its 4 TB to blade server 103 to satisfy the second request for memory in accordance with another instruction received from the memory configuration controller 120.

In block 710, the virtual machines provided by the blade servers 102-104 can access the memory 156 allocated from the CXL blade memory plane 101 in block 708. The virtual machines provided by each of the blade servers 102-104 can also access their own dedicated memory 145-147. The virtual machines can thus access their own dedicated memory and additionally access the allocated memory 156. The additional allocated memory 156 may become available to each of the virtual machines when each of these virtual machines reboots.

In the foregoing example, the blade server 102 may, upon reboot, access 100 GB of additional memory capacity from memory 156 through CXL backplane connectors 111-112 and the CXL backplane interface 110 as a result of the satisfied first request for memory. The blade server 102 may also access its own dedicated memory 145, and the blade server 103 may, upon reboot, access 2 TB of additional memory capacity from memory 156. The access is provided through CXL backplane connectors 111/113 and the CXL backplane interface 110 as a result of the satisfied second request for memory. The blade server 103 may also access its own dedicated memory 146.

The memory that can be accessed by the virtual machine (s) provided by each of the blade server(s) 102-104 can therefore be greatly and dynamically expanded to include the allocated portion of memory 156 on demand to meet changing load requirements. Because the CXL blade memory plane 101 is directly connected to the blade servers 102-104 through the CXL back plane interface 110 (rather than through cabling). All communications between the CXL blade memory plane 101 and the blade servers 102-104, including the blade server(s) 102-104 accessing the allocated portion(s) of the memory 156, can be conducted with high speed and low latency and without losing bandwidth. The available memory bandwidth can therefore be greatly increased. The amount of available memory can be increased on demand and in response to changing memory load requirements. Accordingly, the performance of the computing system 100 can be increased.

In blocks 712-714, the memory configuration controller 120 may receive and process request(s) for deallocating the memory 156 that was previously allocated to one or more of the blade servers 102-104. The deallocation may be complete or partial as requested. The request for deallocation of the previously allocated memory may be received through the input interface provided on the memory configuration controller 120 externally from a human administrator or another computer or may alternatively be received over the cloud from one of the blade servers 102-104 through one of the communications interfaces 163 or the CXL backplane interface 110.

After the previously allocated memory 156 has been released or deallocated, that memory is free to then be reallocated to the same or another blade server in need of additional memory. The amount of allocated memory capacity of memory 156 to a blade server 102-104 can thus be increased or decreased based upon changing memory load requirements. After all of the previously allocated memory 156 has been completely released from the blade server 102-104, the particular blade server 102-104 can still access the dedicated memory 145-147. Other request(s) can be made for the blade server(s) in need of memory to reallocate memory 156 of the CXL blade memory plane 101 if additional memory is again required by any VM being provided by that blade server 102-104.

Turning back to block 706, if the memory configuration controller 120 determines that the CXL blade memory plane 101 cannot meet the request for additional memory ("No" in block 706), then the memory configuration controller 120 provides notification to the virtual machine provided by the blade servers 102-104 in block 716 that the request for memory cannot be met by the CXL blade memory plane 101. Since the request for additional memory cannot be met by the CXL blade memory plane 101, a request for memory to satisfy this unmet request can be sent to the computing device 40. This request will attempt to see if the memory 456 of the computing device 40 can meet this request unmet by the CXL blade memory plane 101 of the rack server 10-30. In other words, if the request for additional memory for a virtual machine provided by a blade server 102-104 cannot be locally met by the CXL blade memory plane 101 within that same rack server 10, a request for additional memory for the virtual machine provided by the blade server 102-104 can be made to the computing device 40. The computing device 40 is arranged outside of the rack server 10 but within the same rack 50, to determine if the memory 456 of the computing device 40 can meet this request.

In block 722, the memory configuration controller 120 receives at least one request for additional memory. This request for additional memory may be received through the input interface provided on the memory configuration controller 120 externally from the human administrator or another computer or from any of the blade servers 102-104 over the cloud and the communications interfaces 163 or the CXL backplane interface 110. Each request may designate how much memory capacity is required. These requests for memory can be for blade servers 102-104 of the same or different rack servers 10-30.

For example, a first request may indicate that 100 GB of memory is needed for a virtual machine being provided by one blade server 102 of rack server 10. A second request may indicate that 2 TB is needed for a virtual machine being provided by the blade server 102 of the rack server 20 (a different rack server), or as an alternative example. The first request may indicate that 100 GB of memory is needed for a virtual machine being provided by one blade server 102 of rack server 10. The second request may indicate that 2 TB is needed for a virtual machine being provided by blade server 103 of the rack server 10 (the same rack server).

In block 724, the memory configuration controller 120 processes the request(s) for additional memory. In particular, the memory configuration controller 120 may operate to determine if the computing device 40 including the capacity of the memory 456 can satisfy the request(s) for additional memory. This may involve the memory configuration controller 120 conducting communications with the CXL switch processing circuitry 454. This communication determines the amount of memory 456 available to be allotted to the blade server 102-104 in need of memory. Communications with the blade server 102-104 determines the amount of additional memory needed by the blade server 102-104 (e.g., the amount of additional memory that is needed by a VM provided by the blade server 102-104 to execute a particular application) in a case where the original request does not indicate such an amount.

If the memory configuration controller 120 determines that the amount of available memory capacity of memory 456 is larger than the amount of memory being requested by the blade servers 102-104 in need, then the memory configuration controller 120 can determine that the requests can be met by the computing device 40. This applies, in particular, when the virtual machine(s) being provided by the blade server(s) is of the same or different rack servers 10-30. For example, consider if the memory configuration controller 120 determines that the amount of available capacity of the memory 456 is 4 TB, and the first and second requests for memory are for 100 GB and 2 TB for virtual machines provided by blade servers on the rack server 10 and the rack server 20, respectively. In this example, the CXL switch processing circuitry 454 can determine that the first and second requests can be satisfied.

If, however, the memory configuration controller 120 determines that the available capacity of memory 456 is less than that requested (perhaps because other portions of the memory 456 have already been allocated), the controller 120 will determine that the first and second requests cannot be satisfied by the computing device 40. Alternatively, the controller 120 may determine that only one of the requests, the first request for only 100 GB [the lesser amount], can be satisfied by the computing device 40.

If the memory configuration controller 120 determines that the request(s) for additional memory can be successfully satisfied ("Yes" in block 726) by the computing device 40, then the memory configuration controller 120 will allocate memory capacity of memory 456 to the virtual machine(s) provided by the blade server(s) 102-104 of the same or different rack servers 10-30 in block 728. In particular, the memory configuration controller 120 can communicate an instruction wirelessly to the CXL switch processing circuitry 454 to allocate at least a portion of memory 456 to the virtual machine(s) provided by the blade server(s) 102-104. The CXL switch processing circuitry 454 may process this instruction received from the memory configuration controller 120.

The CXL switch processing circuitry 454 will instruct the CXL switch fabric 458 to selectively connect portions of the memory 456 to the blade servers 102-104 to satisfy the request(s) for additional memory. The CXL switch processing circuitry 454 can thus allocate a portion or all of the capacity of memory 456 to the blade server(s) 102-104 of the same or different rack server(s) 10-30 to satisfy the request(s) for additional memory.

In an example, the CXL switch processing circuitry 454 may allocate 100 GB of its 4 TB memory capacity of memory 456 to a virtual machine provided by blade server 102 of rack server 10 to satisfy the first request for memory and may also allocate 1 TB of its 4 TB memory capacity of memory 456 to a virtual machine provided the blade server 102 of the rack server 20 (a different rack server) to satisfy the second request for memory. The blade servers which are allocated portions of memory 456 may alternatively be provided on the same rack server.

In block 730, the virtual machine(s) provided by the blade server(s) 102-104 of the same or different rack server(s) 10-30 can access the memory 456 allocated from the computing device 40 in block 728. The virtual machines provided by each of the blade servers 102-104 can also access their own dedicated memory 145-147. The virtual machines can thus access their own dedicated memory 145-147 though internal wiring provided on the printed circuit board. The virtual machine can additionally access the allocated memory 456 through optical or wire cabling that connects optical or wire interface 452 of the computing device 40 and the optical or PCIe wire interface(s) 131-133 of the rack server(s).

The additional allocated memory 456 may become available to each of the virtual machines when each of the virtual machines reboots. In an example, the blade server 102 may, upon reboot, access 100 GB of additional memory capacity from memory 456 through the optical or PCIe wire cabling and the optical or PCIe wire interfaces 452 and 133. This process is a result of the satisfied first request for memory. The blade server 102 may also access its own memory 145. The blade server 103 of the rack server 20 may upon reboot access 2 TB of additional memory capacity from memory 456 through the optical or PCIe wire cabling and the optical or PCIe wire interfaces 452 and 132 as a result of the satisfied second request for memory and may also access its own memory 146.

The memory that can be accessed by the virtual machine(s) provided by the blade server(s) 102-104 of the same or different rack servers 10-30 can therefore be greatly and dynamically expanded to include the allocated portion of memory 456 on demand to meet changing load requirements. Because the computing device 40 is directly connected to the blade servers 102-104 via high-speed optical or PCIe wire cabling within the same rack 50, accessing the allocated portions of the memory 456 can be conducted with high speed and low latency and without losing bandwidth. The available memory bandwidth for a virtual machine can therefore be greatly increased as it is not limited to only the dedicated memory provided by the blade server 102-104 providing the virtual machine. The amount of available memory can be increased on demand and in response to changing memory load requirements. Accordingly, the performance of the computing system 100 can be increased.

In blocks 732-734, the memory configuration controller 120 may receive and process requests for deallocating the memory 456 that was previously allocated to one or more of the blade servers 102-104 of the same or different rack servers 10-30. The deallocation may be complete or partial as requested. The request for deallocation of the previously allocated memory may be received through the input interface provided on the memory configuration controller 120 externally from a human administrator or another computer. Alternatively, the request may be received over the cloud from one of the blade servers 102-104 of the same or different rack servers 10-30 through the communication interfaces 163 or the CXL back plane interface 110.

After the previously allocated memory 456 has been released or deallocated, that memory is free to be allocated to the same or another blade server. The amount of allocated memory to a blade server 102-104 can thus be increased or decreased based upon changing memory load requirements. Even after all of the previously allocated memory 456 has been completely released from the blade server 102-104, the particular blade server 102-104 can still access its own dedicated memory 145-147. Other request(s) can be made by the blade servers to reallocate memory 456 of the computing device 40 if additional memory is again required by the VM being provided by that blade server 102-104.

Turning back to block 726, if the memory configuration controller 120 determines that computing device 40 cannot meet the request for memory ("No" in block 726), the memory configuration controller 120 provides notification to the virtual machine provided by the blade server 102-104 in block 736 that the request for memory cannot be met by the computing device 40.

In alternative example embodiments, modifications to the process 700 above can be made. For example, a virtual machine provided by any blade server 102-104 can obtain and access memory capacity from both memory 156 of the CXL blade memory plane 101 of the same rack server and 456 and the memory 456 of the computing device 40 by virtue of appropriate requests being received and processed by the memory configuration controller 120.

In another alternative example embodiment, a request for additional memory for a virtual machine provided by any blade server 102-104 can be made to the computing device 40 without previously checking whether the requested memory could be provided by the CXL blade memory plane 101 in the same server rack. That is, there is no requirement that a request for expanded memory be denied by the CXL blade memory plane 101 before the request for expand memory is made to the computing device 40. The process illustrated in FIG. 7B could therefore be performed without previously performing the process illustrated in FIG. 7A.

As used herein, the term "substantially" intends that the characteristic needs not be absolute, but is close enough so as to achieve the advantages of the characteristic. For example, "substantially simultaneously" is not limited to operations that are performed absolutely simultaneously and can include timings that are intended to be simultaneous but due to manufacturing limitations may not be precisely simultaneously.

The functions of the rack servers 10-30 and computing device 40 and components thereof including the CXL blade memory plane 101, the blade servers 102-104, CXL switch processing circuitry 454 and CXL switch fabric 458 described herein, may be implemented by processing circuitry such as hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims.

For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Furthermore, the "processing circuitry" and/or various illustrative blocks and components described in connection with the disclosure herein (including the claims) may be implemented or performed with a general-purpose processor, a DSP, an ASIC, a field programmable gate array (FPGA) or other programmable logic device, discrete gate or transistor logic, discrete hardware components, or any combination thereof designed to perform the functions described herein.

A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "transmit", "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components.

At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components.

In some examples, the flow of signals between the connected components may be interrupted for a time, for example, using one or more intermediate components such as switches or transistors. The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and a second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and a second condition or action may occur directly, as a result of the previous condition or action occurring independent of whether other conditions or actions occur.

In some examples, a first condition or action may be performed and a second condition or action may occur directly as a result of the previous condition or action occurring, such that no other intermediate conditions or actions occur between the earlier condition or action and the second condition or action or a limited quantity of one or more intermediate blocks or actions occur between the earlier condition or action and the second condition or action. Any condition or action described herein as being performed "based on," "based at least in part on," or "in response to" some other block, action, event, or condition may additionally or alternatively (e.g., in an alternative example) be performed "in direct response to" or "directly in response to" such other condition or action unless otherwise specified.

The devices discussed herein, including a memory array or memory device, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary block that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory media devices) can refer to one or more memory media devices, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A system comprising:
a rack;
a first rack server mounted within the rack, the first rack server comprising a plurality of blade servers; and
a device including:
a memory interconnect switch fabric;
processing circuitry operatively coupled to the memory interconnect switch;
a memory (i) operatively coupled to the memory interconnect switch and (ii) having at least a portion configured to be selectively connected to one or more of the plurality of blade servers; and
a chassis mounted within the rack, the chassis housing the memory interconnect switch, the processing circuitry, and the memory;
wherein the processing circuitry is configured to control the memory interconnect switch to allocate at least a portion of the memory to the plurality of blade servers.

2. The system of claim 1, wherein the chassis is arranged at a top of the rack.

3. The system of claim 1, wherein the first rack server includes a memory; and a memory capacity of the memory of the device is larger than a memory capacity of the memory of the first rack server.

4. The system of claim 1, wherein the processing circuitry is further configured to control the memory interconnect switch to deallocate the at least a portion of the memory from the plurality of blade servers.

5. The system of claim 1, wherein the device further includes an optical or wire interface configured to be operatively coupled to the memory of the device with the first rack server through optical or wire cabling.

6. The system of claim 1, wherein the first rack server includes an optical or wire interface configured to be operatively coupled with the memory of the device through optical or wire cabling.

7. The system of claim 1, further comprising a second rack server mounted within the rack,
wherein the processing circuitry is further configured to control the memory interconnect switch to allocate another portion of the memory to a plurality of blade servers of the second rack server.

8. The system of claim 7, wherein the first rack server is configured to operate using a first operating system, the second rack server is configured to operate using a second operating system, and the first operating system is different from the second operating system.

9. A method of operating a system including a rack; a first rack server (i) mounted within the rack and (ii) comprising a plurality of blade servers; a device including memory interconnect switch, processing circuitry operatively coupled to the memory interconnect switch, a memory (i) operatively coupled to the memory interconnect switch and (ii) having at least a portion configured to be selectively connected to one or more of the plurality of blade servers, and a chassis mounted within the rack, the chassis housing the memory interconnect switch, the processing circuitry, and the memory; the method comprising:
receiving a request;
controlling the memory interconnect switch to allocate at least a portion of the memory to the plurality of blade servers;
receiving a second request; and
controlling the memory interconnect switch to deallocate the at least a portion of the memory from the plurality of blade servers based on the second request.

10. The method of claim 9, wherein the chassis is arranged at a top of the rack; and
wherein the first rack server includes a memory; and a memory capacity of the memory of the device is larger than a memory capacity of the memory of the first rack server.

11. The method of claim 9, wherein
the device further includes a first optical or wire interface configured to be operatively coupled with the first rack server;
the first rack server includes a second optical or wire interface configured to be operatively coupled with the device; and
the method further comprises conducting communication using the first optical or wire interface and the second optical or wire interface to allocate the at least a portion of the memory to the plurality of blade servers such that the first rack server accesses the at least a portion of the memory.

12. The method of claim 9, wherein
the system further includes a second rack server mounted within the rack; and
the method further comprises controlling the memory interconnect switch to allocate another portion of the memory to a plurality of blade servers of the second rack server.

13. The method of claim 12, further comprising:
operating the first rack server using a first operating system; and
operating the second rack server using a second operating system;
wherein the first operating system is different from the second operating system.

14. A device comprising:
a memory interconnect switch;
processing circuitry operatively coupled to the memory interconnect switch;
a memory (i) operatively coupled to the memory interconnect switch and (ii) having at least a portion configured to be selectively connected to one or more of a plurality of blade servers located within a rack server; and
a chassis mounted within a rack, the chassis housing the memory interconnect switch, the processing circuitry, and the memory;
wherein the processing circuitry is configured to control the memory interconnect switch to allocate at least a portion of the memory to the plurality of blade servers mounted within the rack.

15. The device of claim 14, wherein the chassis is arranged at a top of the rack.

16. The device of claim 14, wherein a memory capacity of the memory of the device is larger than a memory capacity of a memory of the rack server.

17. The device of claim 14, wherein the processing circuitry is further configured to:
control the memory interconnect switch to deallocate the at least a portion of the memory from the plurality of blade servers.

18. The device of claim 14, wherein the device further comprises an optical or wire interface through which the at least a portion of the memory is accessible by the rack server.

19. The device of claim 14, wherein the processing circuitry is further configured to control the memory interconnect switch to allocate another portion of the memory to a plurality of blade servers located within another rack server mounted within the rack.

20. The device of claim 19, wherein the processing circuitry is further configured to:
control the memory interconnect switch to allocate the at least a portion of the memory to the plurality of blade servers located within the rack server, which is configured to operate using a first operating system;
control the memory interconnect switch to allocate another portion of the memory to the plurality of blade servers located within the another rack server, which is configured to operate using a second operating system; and
the first operating system is different from the second operating system.

* * * * *